Figure 1:
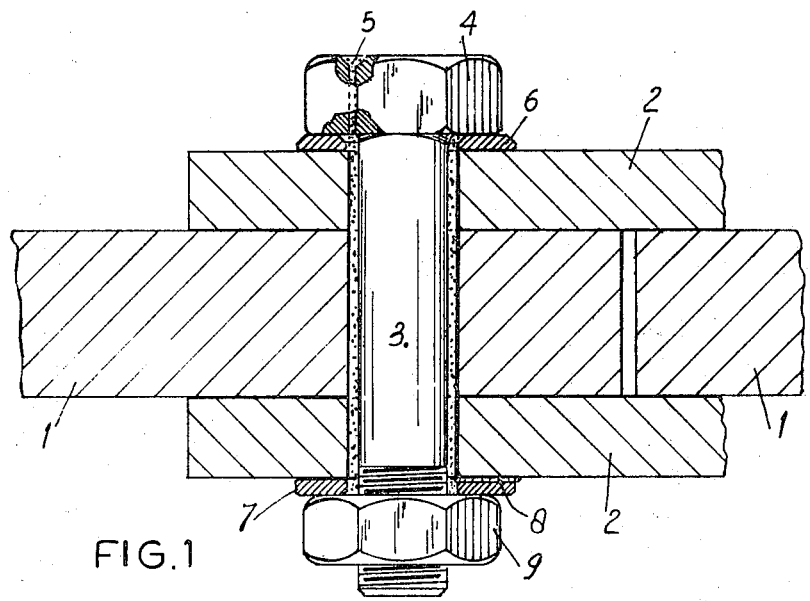

United States Patent

[11] 3,541,917

| [72] | Inventors | Adolf A. VanDouwen<br>31, v. Almondestraat, Delft;<br>Jacobus DeBack, 22, Wilhelminasingel,<br>Pijnacker; Leendert P. Bouwman, 14,<br>Brinkmanstraat, Rotterdam; Herman<br>Kluwen, 3, Kuijperlaan, Pijnacker,<br>Netherlands |
|---|---|---|
| [21] | Appl. No. | 814,001 |
| [22] | Filed | April 7, 1969 |
| [45] | Patented | Nov. 24, 1970 |
| [32] | Priority | April 9, 1968 |
| [33] | | Netherlands |
| [31] | | No. 6804977 |

[54] BOLT SET AND BOLTED JOINT
4 Claims, 2 Drawing Figs.

[52] U.S. Cl. ............................................. 85/1,
85/9, 85/32; 277/2, 277/166; 287/189.36

[51] Int. Cl. ....................................................B65d, 53/06;
E21b 33/10; F16b 35/00

[50] Field of Search............................................ 85/1, 1JP,
32Int., 9, 32, 50; 287/189.36F, 189.36D; 285/93,
292, 294; 151/41.7; 277/2, 166

[56] References Cited
UNITED STATES PATENTS

| 837,767 | 12/1906 | Aims .......................... | 85/1J.P.UX |
| 2,686,066 | 8/1954 | Paquin ........................ | 285/93 |

*Primary Examiner*—Ramon S. Britts
*Attorney*—Imirie, Smiley, Snyder and Butrum

ABSTRACT: Bolt set comprising a threaded bolt the bolthead of which having a through-going channel debouching just beside the bolt body, if desired one or more washers and a nut, the washer adjoining said nut or said nut itself at its side turned towards the bolthead having a vent from its central bore to its circumference.

Patented Nov. 24, 1970

3,541,917

INVENTORS
ADOLF A. van DOUWEN
JACOBUS de BACK
LEENDERT P. BOUWMAN
HERMAN KLUWEN

BY Emisie & Smiley

ATTORNEYS

BOLT SET AND BOLTED JOINT

The invention relates to a bolt set comprising a threaded bolt, the bolthead of which having a through-going channel debouching just beside the bolt body, if required one or more washers and a nut.

Bolts are mostly introduced into wide bolt holes in the parts to be connected so the bolts have a clearance in said holes of about 2 to 3 mm. Between the contact surfaces of the parts to be united a such high pressure is exerted by tightening the nut that the load working perpendicular to the axis of the bolt is transferred by the friction between the contact surfaces of said united parts. If said friction is insufficient a considerable relative shift of said parts may occur and thereafter the bolts are exposed to shearing forces.

As some clearance always exists between the bolt and the nut some moisture may enter into the bolt hole and give rise to formation of rust in said hole, on the bolt body but especially on the contact surfaces between the united parts and consequently the friction between said surfaces would diminish.

In order to prevent said rust formation it is already proposed to fill the annular space around the bolt body with a moisture-excluding plastic material. To that end a bore or channel is formed in the bolthead debouching just beside the bolt body. Said channel will communicate with said annular space after the bolt is introduced in the bolt hole and may be used as a channel for introducing said plastic material.

Especially in the case of tightened bolt connections fully filling the annular space with plastic material has proved to be difficult if not impossible. Moreover it is difficult to see whether said space is filled or not.

An object of the invention is to provide a bolt set with which the said drawbacks are not encountered.

To that end the invention provides a bolt set comprising a threaded bolt, the bolthead of which having a through-going channel debouching just beside the bolt body, if desired one or more washers and a nut, the washer adjoining said nut or said nut itself at its side turned towards the bolthead having a vent from its central bore to its circumference.

If now plastic material is introduced into said annular space the air filling said space will be vented through the vent in the nut or in the spacer and accordingly the space will be fully filled with plastic material. After having filled the space this plastic material will be forced through the vent which is a clearly perceptible sign for the completion of the filling process.

Figure 2:
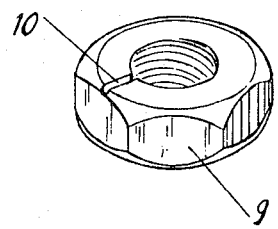

The invention will be elucidated in the following description of some preferred embodiments in connection with the drawings wherein:

FIG. 1 is a cross section through and partly a side view of a bolt set according to the invention introduced into a bolt hole; and FIG. 2 is a perspective drawing of a grooved nut for forming a bolt set according to the invention.

In FIG. 1 the part 1 is united with two junction plates 2 by means of a bolt set. In the bolthead 4 of the bolt 3 bearing the nut 9 a bore 5 is made communicating through the central bore in the washer 6 with the annular space surrounding the body of the bolt. Plastic material is introduced through the bore 5 into the annular space until said material protrudes through a groove 8 in the washer 7, being a sign that the annular space is completely filled.

FIG. 2 is a perspective drawing of a nut 9 having a groove 10 in one of its radial surfaces. Said nut has to be used in such a manner that the grooved surface is turned towards the head of the bolt.

It will be clear that in this connection a shaft having at least two threaded ends and bearing one nut may be considered as a bolt.

We claim:

1. A nut and bolt assembly comprising a bolt including a bolt body having an enlarged bolthead at one end thereof, said head having a passage formed therethrough opening at one end thereof to the exterior of the bolthead and opening at the opposite end thereof adjacent the intersection of the bolthead and the bolt body, the opposite end of the bolt body being threaded, a nut having a central threaded bore formed therethrough and being threaded on the threaded end of said bolt body, said nut having formed in its side facing said bolthead a vent extending from said bore to the radially outer surface of the nut.

2. An assembly as defined in claim 1 wherein said vent comprises a shallow groove.

3. A nut and bolt assembly comprising a bolt including a bolt body having an enlarged bolthead at one end thereof, said head having a passage formed therethrough opening at one end thereof to the exterior of the bolthead and opening at the opposite end thereof adjacent the intersection of the bolthead and the bolt body, the opposite end of the bolt body being threaded, a nut threaded on said threaded end of the bolt body, a washer disposed adjacent said nut at the side thereof facing said bolthead and having a central bore formed therethrough receiving said bolt body, said washer having a vent formed in its side facing said bolthead which extends from said bore to the radially outer surface of the washer.

4. An assembly as defined in claim 3 wherein said vent comprises a shallow groove.